United States Patent [19]
Rush et al.

[11] 3,853,465
[45] Dec. 10, 1974

[54] TURBIDITY REDUCTION IN SERUM AND PLASMA SAMPLES USING POLYOXYETHYLATED LAURIC ACID COMPOUNDS

[75] Inventors: Robert L. Rush, Spring Valley; Daniel L. Vlastelica, Pomona, both of N.Y.

[73] Assignee: Technicon Instruments Corporation, Tarrytown, N.Y.

[22] Filed: June 9, 1972

[21] Appl. No.: 261,499

[52] U.S. Cl......... 23/230 B, 210/DIG. 23, 252/312, 252/363.5, 252/408
[51] Int. Cl..... G01n 33/16, B01f 17/00, C09k 3/00
[58] Field of Search........... 23/230 B; 252/312, 327, 252/363.5, 408, 364; 356/39-42; 210/59 US, DIG. 23

[56] References Cited
UNITED STATES PATENTS
3,002,893  10/1961  Babson .............................. 252/408
3,260,648  7/1966  Fox .................... 23/230 B
3,615,232  10/1971  Parekh .............. 23/230 B Primary Examiner—Joseph Scovronek
Assistant Examiner—Barry I. Hollander
Attorney, Agent, or Firm—Morgan, Finnegan, Durham & Pine

[57] ABSTRACT

The reduction of turbidity in serum and plasma samples to be analyzed photometrically whereby the sample is mixed with a polyoxyethylated lauric acid compound of the formula:

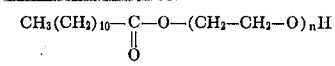

wherein $n$ is an integer from 9 to 20, until it becomes optically clear.

9 Claims, No Drawings

TURBIDITY REDUCTION IN SERUM AND PLASMA SAMPLES USING POLYOXYETHYLATED LAURIC ACID COMPOUNDS

BACKGROUND OF THE INVENTION

This invention relates generally to a method of treating diagnostic samples to place them in condition for effective optical determinations. More particularly, it relates to a method of optically clarifying serum or plasma samples by treating said samples with a polyoxyethylated lauric acid compound thereby substantially decreasing the turbidity existing in these samples.

The presence of elevated levels of enzymes and other materials in the bloodstream of humans and animals is often an indication of certain malfunctions and/or disorders. For example, elevated levels of glutamic oxalic transaminase (GOT) is an important indication of the status of patients with severe heart disease. Accordingly, the determination of the activity of this enzyme in the body is also a useful diagnostic tool for doctors and hospital personnel.

Generally, if any heart muscle damage has taken place or is occurring, this will manifest itself as an increase in GOT levels. In addition to signaling heart disease, elevated GOT levels also indicate the possibility of severe liver disfunctions such as cirrhosis, cancer of the liver or hepatitis.

Similarly, the elevated presence of GPT is reflective of liver disfunctions of the kind just described. Consequently, the prognosis and cause of liver disease can be determined by an accurate GPT determination.

In the foregoing determinations, as well as many others, physical measurement is accomplished photometrically by means of a colorimeter. Typically, the colorimeter contains a flow cell, a photoelectric detector and a light source. The photoelectric cell operates a recorder and a record of the quantity or quantities of different substances in the sample is provided on the chart of the recorder. The recorder has a movable stylus which is operated by a null-type current ratio balancing circuit which includes provision for varying the resistance of various components of the circuit, whereby the record of the analysis directly indicates the quantities of the different substances in the sample.

In addition to enzyme GOT and GPT referred to above, other substances which appear in blood and can be analyzed photometrically include hemoglobin, albumin, protein, bilirubin, lactate dehydrogenase, alkaline phosphatase, acid phosphatase, etc. The process of this invention is applicable in optically clarifying samples tested for these substances as well.

In fact, the present invention has general application for treatment of diagnostic samples which are to be analyzed colorimetrically.

Since photometric analysis hinges on the principle of light scattering it is apparent that if a sample contains contaminants which offset light scattering measurements the resulting optical density determination is misleading and the analysis will be erroneous.

The greatest source of light scattering distortion results from turbidity within the blood sample. Generally, turbidity in serum and plasma samples is due to the presence of lipids primarily composed of triglycerides. As the turbidity of the sample increases so does the optical density, leading to a questionable result.

Furthermore, since most sophisticated diagnostic determinations these days are carried out in the continuous stream of samples, the adverse effect of turbidity is cumulative by what is termed in the art as "carry over." Carry over occurs when a highly turbid sample lays down a small but significant coating of contaminants in the tubing of the analytical system. The next sample passing through will be affected by this coating and the reading therein will be incorrect.

Until now, the problem of sample turbidity was usually alleviated by a dilution technique. This meant that the technician had to add additional diluent to the sample to reduce the turbidity sufficiently to allow the analysis to be carried out. The principal drawback of this method is its subjectiveness. The amount considered to be sufficient is left solely to human discretion, a dubious standard in diagnostic testing. Yet another disadvantage of the dilution technique has to do with the recorded result. An over-dilution will provide a result, while generally satisfactory, may leave too much room for deviation and timely standardization may be required.

Chemical substances have also been used to reduce turbidity in blood samples, however, none equal the ability of the particular polyoxyethylated lauric acid components described herein. Examples of previously used substances include sodium lauryl sulfate; alkylaryl polyether alcohols, sulfonates and sulfates; and polyoxyethylene derivatives of fatty acid partial esters of hexitol anhydrides.

Interestingly, there is a criticality attached to the lauric acid compounds defined herein. The ability severely lessens or is lost if the molecule is changed even slightly. For instance, if the lauric acid moiety is extended or shortened in carbon chain length, effectiveness is decreased or lost. If a double or triple bond is inserted the similar observations are found. The polyoxyethylene moiety is also crucial. If the value for $n$ is less than 9 or greater than 20, a less effective substance is produced.

SUMMARY OF THE INVENTION

Accordingly, the present invention is concerned with the removal of substantial diminishment or turbidity in blood samples so as to permit accurate analyses and to prevent unwanted carry-over.

This invention relates to a method of reducing turbidity in a blood sample for photometric analysis which comprises admixing said sample with a polyoxyethylated lauric acid compound having the formula:

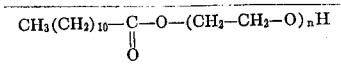

wherein $n$ is an integer from 9 to 20, until it becomes optically clear.

Preferred embodiments of the above shown process are characterized as follows:

A. A polyoxyethylated lauric acid compound having the formula

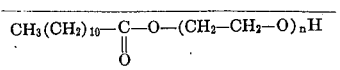

wherein $n$ is from 9 to 20, and preferably 14.

B. A mixing temperature of about 37°C.

C. The polyoxyethylated lauric acid compound added as an aqueous, saline or buffered solution, the amount thereof in the range of from about 0.5 percent to about 20 percent v/v of the total mixture, with 10 percent v/v much preferred.

D. The adaptation of the aforesaid process to any diagnostic method where the analysis of a substance or substances is determined photometrically. Determination of enzymes such as GOT and GPT in blood samples takes advantage of the herein disclosed process for reduction of turbidity.

In addition to GPT and GOT, samples containing other enzymes or substances such as hemoglobin, albumin, protein, bilirubin, lactate dehydrogenase, alkaline phosphatase and acid phosphatase which are colorimetrically measurable can be treated in accordance with the herein disclosed process.

DETAILED DESCRIPTION OF THE INVENTION

The process of this invention directed to the substantial removal of turbidity from a blood sample to be spectrophotometrically analyzed which comprises a mixing step whereby the sample and a polyoxyethylated lauric acid compound of the formula

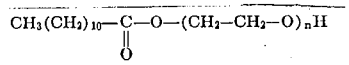

wherein $n$ is an integer from 9 to 20 are combined and agitated until the resulting sample becomes optically clear in a minimal period of time.

As has been explained earlier this turbidity is the end result of an accumulation of lipids, principally triglycerides. Because of this opaqueness, the sample does not lend itself to analyses where a colorimetric determination is utilized. If the turbidity is not removed, the recorded result is meaningless.

The blood sample normally analyzed is either a serum or plasma sample. The removal of turbidity from such samples is necessary whenever they are to be analyzed for a substance photometrically.

It has been found that the turbidity appearing in blood samples can be easily and efficiently removed by adding a compound having the formula:

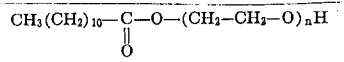

wherein $n$ is 9–20, and preferably 14.

This compound is usually combined with the sample to be tested in aqueous form. The aqueous composition can be an aqueous solution, a saline solution or a buffered solution wherein the pH is in the range from 3.5 to 11. The pH of the buffered solution will generally be about 7 since that is the pH at which most analyses are carried out. However, when the analysis calls for an acid pH as in acid phosphatase determination, an acid buffer such as citrate or phosphate is used. Conversely, when a basic pH is required as in alkaline phosphatase determinations, a basic buffer such as caffein or 2-amino-2-methylpropanol is used.

The analysis of GOT, GPT, LDH, hemoglobin, albumin and bilirubin, utilize essentially neutral solutions.

The amount of polyoxyethylated lauric acid compound in the total mixture is in the range from 0.5 percent to 20 percent v/v, with a 10 percent v/v concentration preferred.

The mixing step is usually carried out in a temperature range of from 20°C to about 60.5°C with 37°C most preferred.

The samples in which the turbidity is substantially removed according to the subject process are in condition for spectrophotometric analysis.

EXAMPLE I

A turbid serum sample (0.2 ml.) was mixed with a 10 percent v/v solution of polyoxyethylated (14) lauric acid (3.0 ml.) in 0.1 Molar phosphate buffer, pH 7.4. The mixing period was about 1 minute at a temperature of 37°C. After this time, the optically clarified sample was determined for GPT activity using Auto Analyzer II SMA 12 MICRO system (all registered trademarks of Technicon Instruments Corporation, Tarrytown, N.Y.).

When 0.2 ml. of the same serum sample was analyzed without the treatment defined above, the recorder pen went off scale beyond the measurable absorbance.

EXAMPLE II

The procedure of Example I is repeated for GOT determination with comparable results.

EXAMPLE III

The procedure of Example I is repeated with a turbid plasma sample with comparable results.

EXAMPLE IV

The procedure of Example I is repeated wherein said polyoxyethylated (14) lauric acid is in the form of a saline solution. Comparable results are obtained.

EXAMPLE V

The procedure of Example I is repeated wherein equivalent amounts of the following compounds are used in lieu of polyoxyethylated (14) lauric acid with similar results:
polyoxyethylated (9) lauric acid
polyoxyethylated (20) lauric acid

EXAMPLE VI

The procedure of Example I is repeated wherein the mixing step is carried out at the following temperatures and similar results are obtained:
30°C
45°C

EXAMPLE VII

A turbid serum sample to be analyzed for alkaline phosphatase is treated substantially as shown in Example I except an aminomethyl propanol buffer solution is substituted for the phosphate buffer providing a pH of 10.25 and similar results are obtained.

EXAMPLE VIII

A turbid serum sample to be analyzed for acid phosphatase is treated substantially as shown in Example I except a citrate buffer solution is substituted for the phosphate buffer providing a pH of 6.0 and similar results are obtained.

What is claimed is:

1. A method of reducing turbidity in a serum or plasma sample for analysis which comprises admixing said sample with a polyoxyethylated lauric acid compound having the formula:

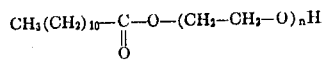

wherein $n$ is an integer from 9 to 20 until it becomes optically clear.

2. The method according to claim 1 wherein said admixing is carried out at a temperature of from about 20°C to about 60.5°C.

3. The method according to claim 2 wherein said temperature is 37°C.

4. The method according to claim 1 wherein said polyoxyethylated lauric acid compound is added as an aqueous solution.

5. The method according to claim 1 wherein said polyoxyethylated lauric acid compound is added as a saline solution.

6. The method according to claim 1 wherein said polyoxyethylated lauric acid compound is added as a buffered solution having a pH in the range of 3.5 to 11.

7. The method according to claim 1 wherein said polyoxyethylated lauric acid compound is present in the total admixture in an amount to provide from about 0.5 percent to about 20 percent v/v.

8. The method according to claim 7 wherein said polyoxyethylated lauric acid compound comprises 10 percent v/v of the total admixture.

9. The method according to claim 1 wherein said polyoxyethylated lauric acid compound is

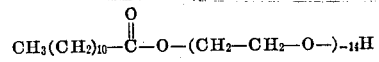

* * * * *